United States Patent [19]

Campbell et al.

[11] 4,107,150
[45] Aug. 15, 1978

[54] HIGH IMPACT TEREPHTHALATE COPOLYESTERS USING 1,4-BUTANEDIOL AND 1,4-CYCLOHEXANEDIMETHANOL

[75] Inventors: Robert W. Campbell; James W. Cleary, both of Bartlesville, Okla.

[73] Assignee: Phillips Petroleum Company, Bartlesville, Okla.

[21] Appl. No.: 690,809

[22] Filed: May 27, 1976

[51] Int. Cl.² ............................................ C08G 63/12
[52] U.S. Cl. ..................................... 528/307; 528/302
[58] Field of Search ........................................ 260/75 R

[56] References Cited

U.S. PATENT DOCUMENTS

| | | | |
|---|---|---|---|
| 2,901,466 | 8/1959 | Kibler et al. | 260/75 R |
| 3,378,402 | 4/1968 | Wiener | 260/75 R |
| 3,522,215 | 7/1970 | Sardessai et al. | 260/75 |
| 3,592,876 | 7/1971 | Brinkmann et al. | 260/75 |
| 3,817,935 | 6/1974 | Beer | 260/75 |
| 3,929,728 | 12/1975 | Chimura et al. | 260/75 |

*Primary Examiner*—Edward M. Woodberry

[57] ABSTRACT

A copolyester having good impact strength is prepared utilizing terephthalic acid or the lower alkyl esters thereof and a mixture of 1,4-butanediol and 1,4-cyclohexanedimethanol as the sole monomers.

4 Claims, No Drawings

HIGH IMPACT TEREPHTHALATE COPOLYESTERS USING 1,4-BUTANEDIOL AND 1,4-CYCLOHEXANEDIMETHANOL

BACKGROUND OF THE INVENTION

This invention relates to high impact copolyesters.

Homopolyesters of ethylene glycol and terephthalic acid are well known in the art and have been used extensively throughout the world in the production of fiber. Such polymers have not proven satisfactory for most ordinary molding applications for a number of reasons including relatively low impact strength. It has been proposed to produce improved polyesters by utilizing a combination of terephthalic acid and homoterephthalic acid as the acid component. However, homoterephthalic acid is not a widely produced material and is substantially more expensive than terephthalic acid. It has also been proposed to utilize poly(butylene terephthalate) since it has a higher rate of crystallization and thus gives a shorter molding cycle. However, poly(tetramethylene terephthalate) does not have the outstanding impact strength which would be desired. It is well known that with many classes of plastic materials, copolymers tend to have better impact strength than the corresponding homopolymers. Consequently, there are numerous suggestions in the art broadly proposing copolymers utilizing two or more diols. However, such copolymers tend to have poor resistance to hydrolysis.

SUMMARY OF THE INVENTION

It is an object of this invention to provide an economically feasible polyester having good impact strength and good resistance to hydrolysis.

In accordance with this invention, there is provided a copolyester from terephthalic acid or lower alkyl esters thereof and a mixture of 1,4-butanediol and 1,4-cyclohexanedimethanol.

DESCRIPTION OF THE PREFERRED EMBODIMENTS

The copolyesters of this invention have good impact strength which might be expected but unexpectedly possess good resistance to hydrolysis and as an added bonus, good resistance to thermal degradation.

In accordance with this invention, a copolyester with desirable properties is produced by the polymerization of diols consisting essentially of both 1,4-butanediol and 1,4-cyclohexanedimethanol with at least one benzenedicarboxylate having the formula

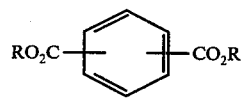

consisting essentially of about 80 to 100 mole percent of at least one terephthalate having the formula

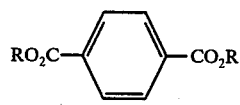

and 0 to about 20 mole percent of at least one compound selected from phthalates having the formula

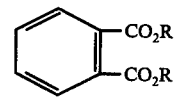

and isophthalates having the formula

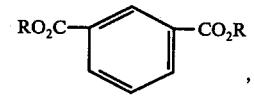

where each R is selected from the group consisting of hydrogen and alkyl radicals having 1 to about 4 carbon atoms, using a catalyst comprising at least one tetraalkyl titanate. Thus, as defined herein, the benzenedicarboxylate for use as a monomer, including terephthalate, phthalate, and isophthalate monomers, is meant to include the diacids and half-acid esters as well as the diesters. The copolyester produced consists essentially of repeating units having the structures

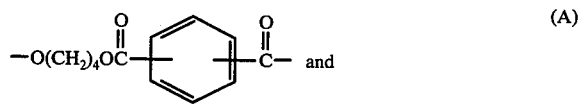

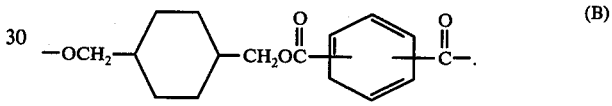

about 3 to about 40 percent, preferably about 4 to about 30 percent, more preferably 5 to 20 percent, by number, of these repeating units having the structure (B). About 80 to 100 percent, by number, of the phenylene radicals in these repeating units are p-phenylene. These copolyesters exhibit better impact strength, better resistance to hydrolysis, and better resistance to thermal degradation than does poly(tetramethylene terephthalate), produced without the use of 1,4-cyclohexanedimethanol as a comonomer. The term "consists essentially of" is used in its conventional sense to exclude other monomers which would alter the beneficial properties of the compositions of this invention. This does not exclude the presence of stabilizers, pigments and other conventional additives.

Examples of some terephthalate monomers which can be employed in the process of this invention include terephthalic acid, methyl terephthalate, isopropyl terephthalate, butyl terephthalate, dimethyl terephthalate, diethyl terephthalate, dipropyl terephthalate, diisopropyl terephthalate, propyl butyl terephthalate, dibutyl terephthalate, and the like, and mixtures thereof. Dialkyl terephthalates are preferred. Dimethyl terephthalate is presently most preferred.

Examples of some phthalate and isophthalate monomers which optionally can be employed in the process of this invention include phthalic acid, isophthalic acid, methyl phthalate, methyl isophthalate, isopropyl phthalate, isopropyl isophthalate, butyl phthalate, butyl isophthalate, dimethyl phthalate, diethyl phthalate, ethyl propyl phthalate, dipropyl phthalate, diisopropyl phthalate, dibutyl phthalate, dimethyl isophthalate, diethyl isophthalate, dipropyl isophthalate, diisopropyl isophthalate, propyl isobutyl isophthalate, dibutyl isophthalate, and the like, and mixtures thereof.

Tetraalkyl titanates having the formula Ti(OR')$_4$, where R' is an alkyl radical having 1 to about 6 carbon atoms, are suitable for use as catalysts in the process of this invention. Examples of some tetraalkyl titanates which can be employed include tetramethyl titanate, dimethyl diethyl titanate, tetraethyl titanate, tetrapropyl titanate, tetraisopropyl titanate, isopropyl tributyl titanate, tetrabutyl titanate, tetraisobutyl titanate, tetrapentyl titanate, tetrahexyl titanate, and the like, and mixtures thereof. If desired, the tetraalkyl titanate can be used in combination with other substances such as magnesium or calcium acetate, inorganic titanates such as lanthanum titanate, calcium acetate/antimony trioxide mixtures, lithium or magnesium alkoxides, or complex titanates derived from alkali or alkaline earth metal alkoxides and titanate esters.

Although the mole ratio of total diols to total benzenedicarboxylates can vary over a wide range, generally it will be within the range of about 1.1:1 to about 5:1, preferably about 1.3:1 to about 3:1. The mole ratio of 1,4-cyclohexanedimethanol to total benzenedicarboxylates also can vary considerably, but generally it will be within the range of about 0.03:1 to about 0.4:1, preferably about 0.04:1 to about 0.3:1. The amount of tetraalkyl titanate can vary greatly, generally being within the range of about 0.05 to about 5, preferably about 0.2 to about 4, millimoles per mole of total benzenedicarboxylates.

The process of this invention should be conducted in two stages sometimes referred to as the esterification or transesterification stage ad the polycondensation stage.

In the esterification or transesterification stage a mixture of 1,4-butanediol, 1,4-cyclohexanedimethanol, benzenedicarboxylate, and catalyst is heated at temperatures within the range of about 130° to about 260° C, preferably about 140° to about 250° C, the temperature preferably being raised gradually. If desired, part or all of the 1,4-cyclohexanedimethanol can be added while the esterification or transesterification stage is in progress, at any time that the reaction temperature is below about 230° C. The pressure generally will be within the range of substantially atmospheric up to about 20 atmospheres, with the final part of this stage normally being conducted at substantially atmospheric pressure. The esterification or transesterification stage is readily conducted over a period of about ¾ hour to about 5 hours, by the end of which time most of the water or alkanol by-product has distilled.

The subsequent polycondensation stage is conducted by maintaining the mixture from the esterification or transesterification stage at a temperature within the range of about 200° to about 260° C, preferably about 210° to about 250° C. In the first part of this stage the pressure is reduced substantially, e.g., from about atmospheric to a level within the range of about 100 to about 400 mm Hg, thereby distilling nearly all of the excess 1,4-butanediol. This distillation can be conducted as rapidly as means for the removal of distillate will permit, usually requiring less than 1 hour. The pressure is then reduced to a level less than about 3 mm Hg, and the temperature is maintained as described above for the polycondensation stage until the inherent viscosity reaches a satisfactory value, i.e., a value of at least 0.9, determined at 30° C in a 3:2 mixture, by weight, of phenol and 1,1,2,2-tetrachloroethane at a polymer concentration of 0.5 g/100 ml solution. Usually this time at which the mixture is maintained at less than about 3 mm Hg will be within the range of about 2 hours to about 8 hours, during at least a major portion of which time it is preferable that an inert gas such as nitrogen be bubbled through the melt to aid in the removal of volatile substances.

Conventional additives such as pigments, antistatic agents, dyes, glass fibers, stabilizers, and flame-proofing agents can be added before, during, or after the esterification or transesterification or polycondensation stage.

Although the polymers of this invention are useful in applications such as films and fibers, they are particularly valuable as molding resins.

EXAMPLE I

In a series of runs, dimethyl terephthalate was reacted with 1,4-butanediol to produce poly(tetramethylene terephthalate), a homopolymer outside the scope of this invention, or with 1,4-butanediol and 1,4-cyclohexanedimethanol in varying ratios to produce copoly(tetramethylene/1,4-cyclohexylenedimethylene terephthalate), these copolyesters being within the scope of this invention.

Each of the runs was conducted in a two-liter, stainless steel, stirred autoclave designed for polycondensation reactions. In each of the runs 5.0 moles of diol component, i.e., 1,4-butanediol plus 1,4-cyclohexanedimethanol, 2.0 moles of dimethyl terephthalate, and about 1.8 millimoles of tetraisopropyl titanate were charged intially to the autoclave except that in Run 6 the 1,4-cyclohexanedimethanol was added after the mixture of other components had been heated to 220° C and the transesterification reaction was essentially completed. No 1,4-cyclohexanedimethanol was used in Run 1.

In each of Runs 1-5 the mixture of components was heated gradually at atmospheric pressure from about 160° to about 210° C during a period of about 1 hour, during which time methanol by-product was removed by distillation. The mixture was then maintained at about 210°-220° C at atmospheric pressure for 1 hour, during which time additional methanol distilled. House vacuum (about 210 to about 330 mm Hg pressure) was then applied slowly over approximately 10 minutes as the temperature was raised to about 240°-250° C, at which temperature and pressure the mixture was maintained for about 10 minutes. The pressure was reduced to 1 mm Hg or less and maintained there for about 30 minutes. With the temperature still at about 240°-250° C and the pressure at 1 mm Hg or less, a small stream of nitrogen was then bubbled through the melt for 3-4½ hours. The product was then removed from the autoclave.

Run 6 was conducted in essentially the same manner except that a mixture of the dimethyl terephthalate, 1,4-butanediol, and tetraisopropyl titanate was heated gradually at atmospheric pressure from about 160° to about 220° C, with distillation of methanol by-product, over a period of about 1½ hours prior to the addition of the 1,4-cyclohexanedimethanol, followed by use of house vacuum, lower pressure, and a nitrogen stream as described above, except that the pressure rose to as much as 2.1 mm Hg during the bubbling of nitrogen through the melt.

Each of the resulting polymers was then evaluated. Table I gives the values for inherent viscosity (I.V.), glass transition temperature ($T_g$), and crystalline melting point ($T_m$) of the polymers as well as other properties of specimens of the polymers compression molded at 246° C for about 10 minutes. Also shown in Table I are the I.V. and weight retention of finely ground polymer samples (1g) after being subjected to hydrolysis by heating with aqueous 1N sodium hydroxide (15 ml) in sealed tubes maintained at 100° C for 359 hours, with occasional shaking, followed by washing with hot water.

ypivalyl hydroxypivalate in place of the 1,4-cyclohexanedimethanol. The results are shown hereinbelow in Table II.

TABLE II

| Run | 1[a] (control) | 3[a] | 5[a] | 7 (control) | 8 (control) | 9 (control) | 10 (control) |
|---|---|---|---|---|---|---|---|
| Comonomer[b] | none | CHDM | CHDM | NP | NP | HPHP | HPHP |
| mole % | 0 | 10 | 20 | 4 | 8 | 10 | 20 |
| I.V. before Being Subjected to Hydrolysis | 1.18 | 1.11 | 1.18 | 1.17 | 1.15 | 1.09 | 0.97 |
| I.V. after Being Subjected to Hydrlolysis | 0.68 | 0.73 | 0.80 | 0.60 | 0.58 | 0.43 | 0.42 |
| Weight Retention after Being Subjected to Hydrolysis, % | 55 | 57 | 65 | 47 | 45 | 30 | 31 |

[a]Repeat of runs from Table I.
[b]CHDM is 1,4-cyclohexanedimethanol
NP is neopentylene glycol.
HPHP is hydroxypivalyl hydroxypivalate.

TABLE I

| Run | 1 (control) | 2 | 3 | 4 | 5 | 6 |
|---|---|---|---|---|---|---|
| CHDM, mole %[a] | 0 | 5 | 10 | 15 | 20 | 20 |
| $T_g^{[b]}$ | 34 | 30 | 34 | 37 | 38 | 35 |
| $T_m^{[b]}$ | 225 | 217 | 212 | 205 | 199 | 200 |
| I.V. before Molding[c] | 1.18 | 1.15 | 1.11 | 1.18 | 1.18 | 1.10 |
| I.V. after Molding[c] | 0.98 | 1.10 | 1.08 | 1.12 | 1.10 | 1.04 |
| Density, g/cc[d] | 1.323 | 1.308 | 1.303 | 1.294 | 1.286 | 1.286 |
| Hardness, Shore D[e] | 80 | 80 | 78 | 80 | 78 | 78 |
| Heat Deflection Temperature, ° C at 264 psi[f] | 52 | 50 | 52 | 46 | 50 | 51 |
| Heat Deflection Temperature ° C at 66 psi[f] | 182 | 171 | 160 | 129 | 61 | 64 |
| Flexural Modulus, psi × 10⁻³ [g] | 388 | 338 | 314 | 303 | 277 | 272 |
| Tensil Yield, psi[h] | — | 7590 | 7580 | 7000 | 6970 | 6530 |
| Tensile Break, psi[h] | 8930 | — | — | — | — | — |
| Elongation, %[h] | 20 | 27 | 40 | 40 | 54 | 300 |
| Izod Impact Strength, ft-lb/in notch[i] | 0.63 | 0.70 | 0.73 | 0.71 | 1.05 | 1.32 |
| I.V. after Being Subjected to Hydrolysis | 0.68 | —[j] | 0.73 | —[j] | 0.80 | —[j] |
| Weight Retention after Being Subjected to Hydrolysis, % | 55 | —[j] | 57 | —[j] | 65 | —[j] |

[a]Amount of 1,4-cyclohexanedimethanol employd, expressed as mole percent of the amount of dimethyl terephthalate used.
[b]Determined on premelted and quenched polymer samples by differential thermal analysis.
[c]Determined at 30° C in a 3:2 mixture, by weight, of phenol and 1,1,2,2-tetrachloroethane at a polymer concentration of 0.5 g/100 ml solution.
[d]ASTM D 1505–68.
[e]ASTM D 2240–68.
[f]ASTM D 648–56.
[g]ASTM D 790–70.
[h]ASTM D 638–68.
[i]ASTM D 256–70.
[j]Not determined.

As shown in Table I, the copolyesters in Runs 2–6, all within the scope of this invention, exhibited greater impact strength than did the homopolyester in Run 1, outside the scope of this invention. Additionally, the copolyesters in Runs 2–6 underwent less thermal degradation during molding than did the homopolyester in Run 1, as shown by the values for I.V. before and after molding each of the polymers. Furthermore, the copolyesters were more resistant to hydrolysis than was the homopolyester, as can be seen by a comparison of data in Runs 3 and 5 with data in Run 1 showing that the hydrolysis treatment resulted in a smaller reduction of I.V. for the copolyesters than for the homopolyester as well as resulting in better weight retention of the copolyesters than of the homopolyesters.

EXAMPLE II

The effect of other comonomers on the hydrolysis resistance of tetramethylene terephthalate polymers was demonstrated by preparing copolymers from dimethyl terephthalate, 1,4-butanediol, and either neopentylene glycol (2,2-dimethyl-1,3-propanediol) or hydrox- A comparison of run 1 with runs 3 and 5 shows that the copolymers utilizing 1,4-cyclohexanedimethanol comonomer of this invention exhibit increased resistance to hydrolysis. This stands out in contrast to runs 7 to 10 wherein use of each of neopentylene glycol or hydroxypivalyl hydroxypivalate (instead of 1,4-cyclohexanedimethanol) resulted in a copolymer having decreased resistance to hydrolysis. Thus, rather than exhibiting a compromise in properties, i.e. a sacrifice in hydrolysis resistance in order to get improved impact, the polymers of this invention exhibit an increase in resistance to hydrolysis as well as an increase in impact strength, whereas the other copolymers exhibit the expected compromise in properties with the hydrolysis resistance going down as the impact resistance improved.

While this invention has been described in detail for the purpose of illustration, it is not to be construed as limited thereby but is intended to cover all changes and modifications within the spirit and scope thereof.

We claim:

1. A copolyester consisting essentially of repeating units having the structures

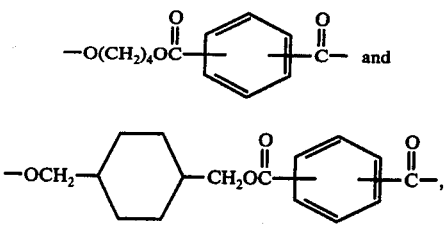

wherein there is present about 3 to about 40 percent by number of repeating units (B) and wherein about 80 to 100 percent by number of the phenylene radicals in all of the repeating units are para-phenylene.

2. A composition according to claim 1 wherein about 4 to about 30 percent by number of the repeating units have the structure (B).

3. A composition according to claim 1 wherein all of the phenylene radicals are para-phenylene.

4. A composition according to claim 3 wherein 5 to 20 percent by number of the repeating units have the structure (B).

* * * * *